R. H. POTEET.
FAN DRIVE PULLEY.
APPLICATION FILED JAN. 9, 1919.

1,320,089.

Patented Oct. 28, 1919.

Inventor
R. H. Poteet
By Chandler & Chandler
Attorneys.

UNITED STATES PATENT OFFICE.

ROBERT H. POTEET, OF SOLGOHACHIA, ARKANSAS.

FAN-DRIVE PULLEY.

1,320,089. Specification of Letters Patent. Patented Oct. 28, 1919.

Application filed January 9, 1919. Serial No. 270,348.

*To all whom it may concern:*

Be it known that I, ROBERT H. POTEET, a citizen of the United States, residing at Solgohachia, in the county of Conway, State of Arkansas, have invented certain new and useful Improvements in Fan-Drive Pulleys; and I do hereby declare the following to be a full, clear, and exact description of the invention, such as will enable others skilled in the art to which it appertains to make and use the same.

This invention relates to new and useful improvements in cranking devices for automobiles and particularly to such parts as are incorporated in the pulley which drives the fan shaft.

One object of the present invention is to provide a novel and improved pulley wherein the forward end of the crank shaft can be attached by means of the starting ratchet pin, thus making the ratchet pin serve a double function.

Another object is to provide a novel and improved pulley of this character wherein the starting ratchet pin is positively held against displacement and free from wear at such points as tend to cause the pin to become loose.

Other objects and advantages will be apparent from the following description when taken in connection with the accompanying drawing.

Figure 1:
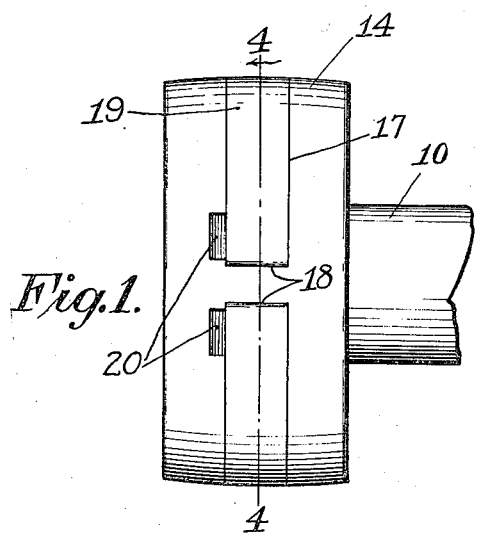
Figure 1 is a side elevation of the fan belt pulley mounted on the forward end of the crank shaft of the engine of a Ford automobile.
Figure 2:
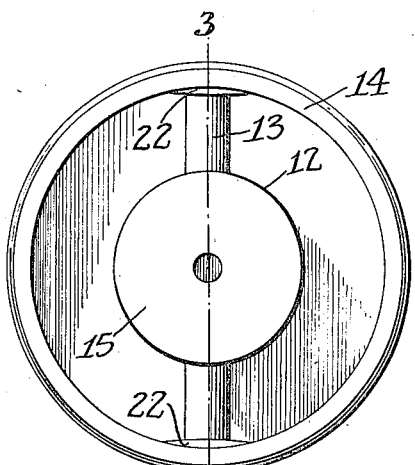
Fig. 2 is a front elevation of the same.
Figure 3:
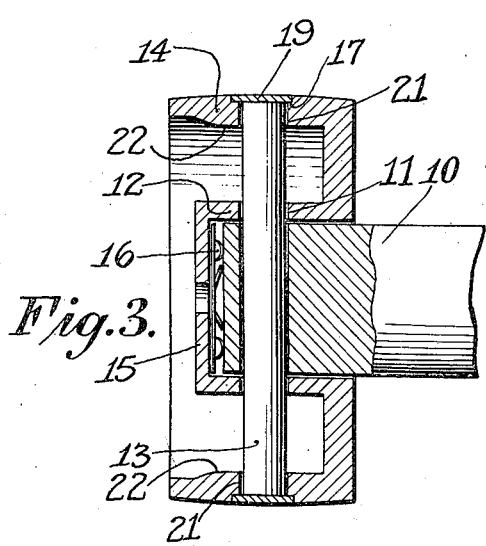
Fig. 3 is a vertical longitudinal sectional view taken on the line 3—3 of Fig. 2.
Figure 4:
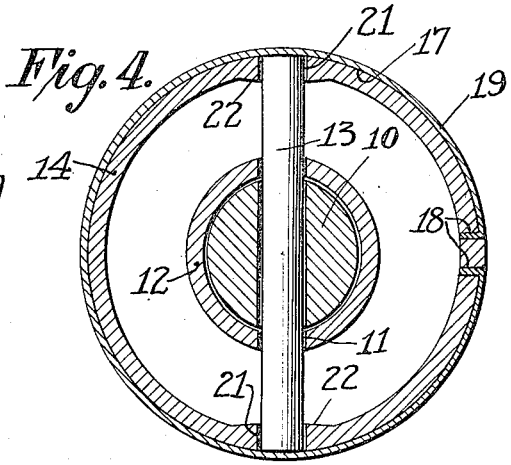
Fig. 4 is a vertical transverse sectional view taken on the line 4—4 of Fig. 1, showing the arrangement of the retaining spring band.
Figure 5:
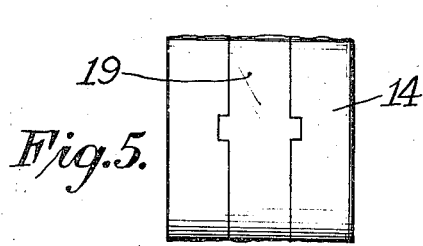
Figure 6:
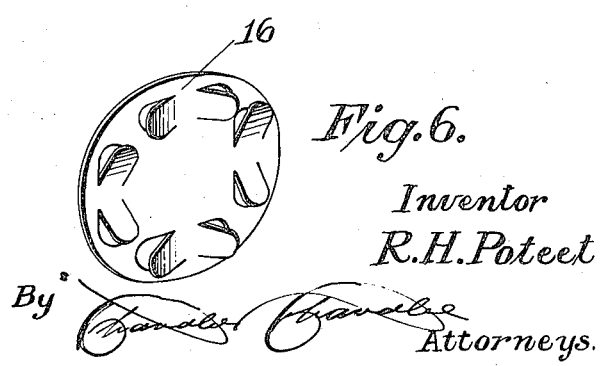

In the fan belt wheel or pulley which is carried by the forward end of the engine shaft, of the Ford automobile, the starting ratchet pin is disposed transversely through the central hollow hub of the pulley and the ends of this pin, inwardly of the flange of the hub, are provided with transverse cotter pins which hold the pin against longitudinal movement. These pins are frequently broken with the result that the ratchet pin slides through one of the openings in the flange of the pulley and renders the cranking of the engine impossible. Furthermore, the pin has a tendency to become worn by the hub flange so that the pin becomes loose, and the pulley permitted to wabble on the engine shaft. It is the particular object of the present invention to overcome these defects, whereby the pin will be held from displacement and the pulley held from wabbling on the engine shaft. Furthermore, the present invention does away with the use of the cotter pins.

Referring particularly to the accompanying drawing, 10 represents the forward end portion of the engine shaft on which the fan belt pulley is mounted, as shown at 11. This pulley is formed with the hub portion 12 into the inner end of which the forward end of the engine shaft is disposed. The starting ratchet pin 13 is then passed through the outer flange 14 of the pulley, and through the engine shaft. It will, however, be noted that the outer end of the hub is closed, as shown at 15. Within the hub, and bearing against the inner face of the closed end, is a spring member 16 which also bears against the adjacent end of the engine shaft to hold the same firmly in engagement with the ratchet pin. In the peripheral face of the pulley there is formed a circumferential groove 17, and this groove terminates, at its ends, at the slots 18 formed through the flange of the pulley. The ends of the spring band 19, which is disposed in the groove 17, are turned inwardly at right angles and engaged in said slots, whereby the band is held against displacement, and also against rotative movement in said groove. Adjacent each of the slots there is formed a beveled notched portion 20 to permit the introduction of a screw driver point beneath the ends of the spring band for the purpose of removing the same.

It will be noted that the ends of the pin 13 pass through openings 21 in the bosses 22, which are formed on the inner face of the outer flange of the pulley, and terminate flush with the bottom wall of the groove 17, so that the spring band engages with said ends to hold the pin against any tendency toward endwise movement.

The spring 16 serves to prevent rattling of the engine shaft and the pulley thereon, whereby danger of the pin and hub portion of the pulley wearing and becoming loose, is obviated. The spring band takes the place of the cotter pins first-mentioned, so that all of the parts are positively and firmly held in place.

What is claimed is:

1. The combination with the forward end of the shaft of an automobile engine, of a belt wheel for the fan mounted thereon, said belt wheel having a central hub portion with a closed outer end, the peripheral face of the pulley being formed with a circumferential groove terminating at adjacent points in slots, a starting ratchet pin disposed transversely through the pulley and engine shaft and having its opposite ends lying in the same plane as the bottom wall of the said groove, and a spring band disposed in said groove and having its ends turned into said slots and bearing against the ends of said pin.

2. The combination with the forward end of an automobile engine shaft, of a fan belt pulley having an outer peripheral flange and an inner hub portion, the said hub portion being closed at its outer end, the said end of the engine shaft being disposed within said hub portion, a transverse pin disposed through the pulley and engine shaft, a resilient member within the hub portion and bearing on the end of the engine shaft, and means carried by the outer peripheral face of the pulley and engaging with the ends of the said pin to hold the same from movement.

3. A fan shaft pulley for an automobile engine shaft including a flanged body having a central hub portion for the reception of the engine shaft, a transverse starting ratchet pin disposed through the pulley and engine shaft, and means carried circumferentially on the pulley for holding the pin against longitudinal movement, and means within the hub portion and engaging therewith and with the engine shaft for holding the pulley against movement on the said shaft.

In testimony whereof, I affix my signature in the presence of two witnessess.

ROBERT H. POTEET.

Witnesses:
    J. D. FRYER,
    R. L. TICE.